United States Patent [19]

Ogata et al.

[11] 4,153,770

[45] May 8, 1979

[54] EMULSIFIER FOR EMULSION POLYMERIZATION

[75] Inventors: Yuzuru Ogata; Takeshi Kawaguchi; Ikuya Kinoshita; Hirokazu Nakayama; Toshinao Ukena, all of Wakayama, Japan

[73] Assignee: Kao Soap Co., Ltd., Tokyo, Japan

[21] Appl. No.: 833,680

[22] Filed: Sep. 15, 1977

[30] Foreign Application Priority Data

Oct. 1, 1976 [JP] Japan .................... 51-118355

[51] Int. Cl.$^2$ .................... C08F 2/30; C08F 120/12
[52] U.S. Cl. .................... 526/209; 526/328
[58] Field of Search .................... 526/209

[56] References Cited

U.S. PATENT DOCUMENTS

| | | | |
|---|---|---|---|
| 2,580,277 | 12/1951 | Boyd et al. | 526/209 |
| 2,886,551 | 5/1959 | McNulty et al. | 526/209 |
| 2,886,552 | 5/1959 | Heiligmann et al. | 526/209 |
| 3,226,375 | 12/1965 | Greth et al. | 526/209 |
| 3,578,648 | 5/1971 | Taima et al. | 526/209 |

*Primary Examiner*—Harry Wong, Jr.
*Attorney, Agent, or Firm*—Blanchard, Flynn, Thiel, Boutell & Tanis

[57] ABSTRACT

Vinyl polymers are prepared by emulsion polymerization using as an emulsifier a nonionic surfactant which has been prepared by adding 30 to 100 mols of alkylene oxide to one mol of a polyhydric alcohol having from 3 to 10 functional hydroxyl groups to form a first reaction product and then esterifying said first reaction product to introduce therein one to 2 mols of an acyl group having from 6 to 22 carbon atoms.

6 Claims, No Drawings

EMULSIFIER FOR EMULSION POLYMERIZATION

BACKGROUND OF THE INVENTION

1. Field of the Invention

The present invention relates to an emulsifier adapted for use in the process of emulsion polymerization of vinyl monomers. More specifically, the present invention provides a nonionic surfactant which can be used as an emulsifier in the emulsion polymerization reaction of vinyl monomers. The nonionic surfactant is prepared by adding 30 to 100 mols of an alkylene oxide to 1 mol of a polyhydric alcohol having 3 to 10 functional hydroxyl groups and then esterifying the resultant compound thereby to introduce 1 to 2 mols of an acyl group having 6 to 22 carbon atoms.

2. Description of the Prior Art

The emulsion polymerization process is of industrial utility for polymerizing vinyl monomers. Polymers prepared by means of the emulsion polymerization process include polyvinyl chloride, synthetic rubbers, polyacrylic acid esters, polymethacrylic acid esters, polyvinylidene chloride, polychloroprene and copolymers thereof. The aforementioned polymers can be recovered from the emulsions for use in the forms of moldable plastics or rubbers, or they can be used in the emulsified state for adhesives, paper processing, fiber processing or other general industrial uses.

Anionic surfactants, such as sulfates of long chain alcohols, alkylbenzene sulfonates and soaps, and nonionic surfactants, such as polyoxyethylenealkyl ethers, polyoxyethylenealkylphenyl ethers, polyoxyethylenesorbitan fatty acid esters or polyoxyethylene fatty acid esters, have been used as emulsifiers for emulsion polymerization, either singly or in mixtures of anionic and nonionic surfactants.

The particular emulsifier used in the emulsion polymerization process exerts significant influences not only on the initiation and propagation reactions in polymerization, but also on the stability of the polymerizing resin emulsion and further on the mechanical and chemical stabilities of the resultant resin emulsion and on the stability of the emulsion when it is frozen or stored.

In general, anionic surfactants have high emulsifying activity and the resin emulsions formed by the use of such anionic surfactants have superior mechanical stabilities. However, the anionic surfactants have disadvantages in that if polyvalent cations, such as calcium ions, aluminum ions, magnesium ions or barium ions, are admixed into the emulsion, insoluble salts are formed thereby to demulsify the system. Consequently, it is difficult to use an anionic surfactant as the emulsifier when the emulsified resin is put to use with the addition of a filler material such as an inorganic pigment or salts or oxides of various metals. It is preferable to use a nonionic surfactant in the latter case.

As will be understood from a consideration of their molecular structures, the nonionic surfactants are not as sensitive to various ions as are the ionic surfactants, and they have higher chemical stabilities than the ionic surfactants. However, a large amount of agglomerated products is formed during the polymerization reaction and the mechanical stability of the resultant resin emulsion is not satisfactory when polyoxyethylenealkyl ethers, polyoxyethylene fatty acid esters, or polyoxyethylenesorbitan fatty acid esters, are used as the emulsifier for emulsion polymerization. On the other hand, the amount of the agglomerated products formed is small and the resultant resin emulsion is superior in its mechanical and chemical stabilities when a polyoxyethylenealkylphenyl ether is used as the emulsifier for emulsion polymerization. For this reason, polyoxyethylenealkylphenyl ethers have been preferred for use as the emulsifiers for the emulsion polymerization of vinyl monomers.

However, in recent years waste water processing has become a serious problem and the oil content and the COD value of the waste water is strictly regulated. Polyoxyethylenealkylphenyl ethers, which have been conventionally used as emulsifiers for emulsion polymerization, have benzene nuclei in their lyophilic portions and they are extremely difficult to decompose by microbiological attack. In order to remove or recover the same from the waste water, large size equipment and great expense is required. Moreover, it is undesirable to flow non-decomposed alkylphenols into bodies of waters, such as lakes, rivers and seas, in view of their poisonous characters. For this reason, the use of nonylphenol has been discontinued in European countries. A new nonionic surfactant is required which can be used in place of the polyoxyethylenealkylphenol ethers.

SUMMARY OF THE INVENTION

We have discovered a nonionic surfactant which can be easily decomposed by microorganisms and which can be used effectively as the emulsifier for emulsion polymerization to prepare a resin emulsion which has superior mechanical and chemical stabilities. We have found that only a small amount of agglomerated products is formed during the polymerization reaction and a resin emulsion of low viscosity and having good mechanical and chemical stabilities can be obtained by the use of a nonionic surfactant having a particular molecular structure as the emulsifier for the emulsion polymerization.

Specifically, the present invention provides an emulsifier for emulsion polymerization which gives a resin emulsion of low viscosity having good mechanical and chemical stabilities, the emulsifier essentially consisting of a nonionic surfactant which is prepared by adding 30 to 100 mols of an alkylene oxide to 1 mol of a polyhydric alcohol having 3 to 10 functional hydroxyl groups and then esterifying the resultant compound thereby to introduce 1 to 2 mols of an acyl group having 6 to 22 carbon atoms.

The preferred group of the emulsifiers according to the present invention includes long chain fatty acid esters of the addition products of polyhydric alcohols to polyalkylene oxides, as set forth in the following Formula-1, as the main component.

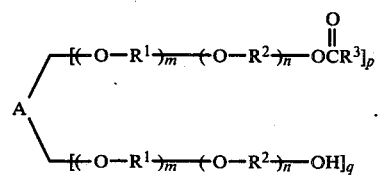

In the above Formula-1, A is an aliphatic or alicyclic polyhydric alcohol residue having $(p+q)$ hydroxyl groups; wherein p and q are numbers defined by the relations of $3 \leq p+q \leq 10$ and $1 \leq p \leq 2$; $R^1$ and $R^2$ are alkylene having 2 to 4 carbon atoms, respectively, and $R_1$ and $R_2$ can be the same or different; $R^3$ is alkyl or alkenyl having 5 to 21 carbon atoms; and m and n are numbers defined by the relation $30 \leq (m+n) \times (p+q) \leq 100$.

The polyhydric alcohols used in the present invention include $C_3$-$C_{10}$ polyhydric alcohols which are derived from natural saccharides such as glycerin, adonite, erythrite, rhamnose, mannitol, sorbitol, dulcitol or inositol, synthetic polyalcohols and disaccharides such as sucrose. Ethylene oxide, propylene oxide or butylene oxide is added, singly or in combination, to each of the hydroxyl groups thereof in the molar ratio of 30 to 100 mols, preferably 30 to 80 mols, of the alkylene oxide per one mol of the starting polyhydric alcohol by the conventional method. One or two of the terminal hydroxyl groups of the resultant polyalkyleneoxide adduct are esterified with a long chain fatty acid having 6 to 22, preferably 14 to 18, carbon atoms, whereby the compounds having the Formula-1 are formed. Alternatively, the same compounds can be produced by first esterifying the polyhydric alcohols and then adding the desired alkylene oxides to the esterified polyhydric alcohols.

While the esters of the long chain fatty acids and the polyalkyleneoxide adducts of the polyhydric alcohols, according to the present invention, can be synthesized by the generally known method as mentioned above, a detailed description of the synthesis method will be given hereinbelow.

In general, the conventional method can be employed for synthesizing the polyalkyleneoxide adducts of the polyhydric alcohols, which adduct can be used as the intermediate for preparing the aforementioned emulsifiers. However, the following process is recommended when the starting polyalcohols are not melted or tend to change their chemical structures by complex reactions, such as intramolecular or intermolecular dehydration or decomposition, under the normal reaction conditions for adding the alkylene oxides, such as would be the case for sucrose. The recommended process comprises the steps of dispersing the starting polyhydric alcohol in a solvent such as toluene or xylene, adding a commonly used basic catalyst such as sodium hydroxide, and then adding the desired amount of an alkylene oxide at room temperature under pressure whereby to obtain an adduct. In the alternative process, an alkylene oxide can be added to a polyhydric alcohol using a basic catalyst and a reaction medium such as water, ethylene glycol or glycerin. The amount of the reaction medium employed is as small as possible, provided that the reaction mixture is in liquid form at the reaction temperature so that the alkylene oxide can be added to the alcohol. In the latter process, it is necessary to add an excess amount of the alkylene oxide wherein the excess is equivalent to the amount of the alkylene oxide that combines with the reaction medium in order that the desired amount of the alkylene oxide is added to the polyhydric alcohol.

The polyalkylene oxide adduct of the polyhydric alcohol is then esterified with a long chain fatty acid by means of a conventional esterification method using a basic catalyst.

As described above, the emulsifier of the present invention can also be synthesized by the process of preliminarily synthesizing a long chain fatty acid ester of a polyhydric alcohol, and then adding an alkylene oxide to the resultant product.

The thus obtained nonionic surfactants have extremely improved properties in comparison with the conventional emulsifiers consisting of any of the known nonionic surfactants. The emulsifier of the present invention exerts a strong emulsifying activity when used in the emulsion polymerization of monomers having vinyl bonds and has the advantages that the amount of the lumps or agglomerates formed during the polymerization reaction is extremely small, the formed resin emulsion is stable enough to store for a long time and the resin emulsion has superior chemical and mechanical stability and low viscosity. It is considered that the above-mentioned advantageous characteristics of the Formula-1 emulsifier are closely related to the molecular structure thereof which is different from those of the conventionally known nonionic emulsifiers. In structural terms, the emulsifier according to the present invention has a molecular structure wherein a long chain alkyl group forms a stem, and wherein the polyhydric alcohol residues form rivets from which the polyalkylene oxide groups extend in fan-like fashion, the polyhydric alcohol residues being interposed between the stem made of the alkyl chain and the rivets made of the polyhydric alcohol residues to form intermediate portions which combine the stem portion with the rivet portions. Due to this particular molecular structure, the emulsifier of the invention exerts a strong dispersing activity which would not be expected from the known nonionic surfactants. In contrast to the emulsifier of the present invention, polyoxyethylenesorbitan fatty acid ester cannot sufficiently adsorb the dispersed phase because of steric hindrance and hence it does not exert a sufficiently strong dispersing activity, because it is prepared by first esterifying sorbitol and then adding ethylene oxide so that the alkyl group thereof is directly combined with the polyhydric alcohol residues to cause steric hindrance, even though it has a stem made of an alkyl chain, rivets made of polyhydric alcohol residues and the fan-like extensions made of polyalkylene oxide groups. In fact, as will be illustrated in the following Reference Examples, if the conventional polyoxyethylene sorbitan ester is used in emulsion polymerization, the formed polymers will agglomerate during the polymerization reaction so that a stable polymer emulsion cannot be formed.

Nonionic surfactants having an HLB value of 13 to 17 are commonly used as the emulsifiers for emulsion polymerization. According to the present invention, emulsifiers having an HLB value of more than 13 can of course be employed for emulsion polymerization, and those having an HLB value of 17 to 19 are preferably employed, because they have the characteristic structures as mentioned above.

It has been impossible to form a stable emulsion using any conventional surfactants having a very high HLB value, for example higher than 17. In this connection, the present invention makes it possible to form an emulsion possessing advantageous properties even when there is used an emulsifer having such a high HLB value.

The emulsifiers according to the present invention can be used either singly or in combination, and they can also be used in combination with any of the conventionally known surfactant emulsifiers.

Alkylene oxides preferably used in the present invention include ethylene oxide, propylene oxide and butylene oxide, the most preferable ones being ethylene oxide and propylene oxide.

An appropriate reaction rate can be attained when the nonionic surfactant of the present invention is used for emulsion polymerization in the same fashion as in the case when a conventional nonionic surfactant is used. Accordingly, the existing polymerization system and technique can be used without any alteration.

In similar manner to the conventional nonionic surfactants, the nonionic surfactant of the present invention can be used together with any effective ionic surfactant.

The present invention will now be described with reference to Preparations (Synthesis Examples) and Examples embodying the present invention.

It will be appreciated that the process of making the emulsifier of the present invention is not limited to the synthesizing processes described in the following illustrative Preparations. Although emulsion polymerization of acrylate monomers is mainly shown in the following Examples for purposes of illustration, the present invention is not limited to emulsion polymerization of those monomers.

PREPARATION 1 (CONTROL)

191.6 g of 95% aqueous solution of sorbitol (containing 1 mol of sorbitol) was put into a five liter pressure reaction vessel equipped with an agitator, and 2 g of NaOH, which acts as the catalyst, was added thereto. Ethylene oxide was successively added into the vessel at 130° to 140° C. under a pressure of 3 to 5 kg/cm$^2$G until 1,036 g of ethylene oxide was reacted with the sorbitol to obtain 1,225 g of the reaction product which contains POE(20) sorbitol as the main component. The reaction product was a viscous liquid of light yellow color which had an OH value of 323 (Calcd. value: 317).

1,000 Grams of the thus-obtained POE(20) sorbitol (containing 0.816 mols of sorbitol) and 269 g (0.959 mols) of oleic acid was put into a four-neck reaction flask of two liter volume, and the dehydration-and-esterification reaction was conducted at 200° to 230° C. until an acid value of less than 1 was attained while a small amount of nitrogen gas was continuously blown into the flask. Then, 2.7 g of phosphoric acid was added to the mixture and the mixture was agitated for an additional 1 hour and thereafter neutralized and filtered to obtain 1,245 g of PEO(20) sorbitol monooleic acid ester which was a light brown transparent liquid. The resultant ester had an acid value of 2.2, a saponification value of 42.9 and an OH value of 215.0.

PREPARATION 2 (INVENTION)

1,743 Grams of POE(30) sorbitol was formed similarly as in Preparation 1 except that the added amount of ethylene oxide was changed to 1,554 g. The resultant POE(30) sorbitol was a light yellow, viscous liquid and had an OH value of 230 (Calcd. value: 224).

1,268 Grams of POE(30) sorbitol sesquioleic acid ester was obtained by means of an esterification process similar to the one described in Preparation 1 except that 1,000 g of the POE(30) sorbitol (containing 0.574 mols of sorbitol) was allowed to react with 284 g (1.013 mols) of oleic acid, and that the reaction mixture was neutralized with 1.9 g of phosphoric acid. The resultant ester was a light brown, transparent liquid having an acid value of 2.0, a saponification value of 44.9 and an OH value of 135.8.

PREPARATIONS 3 TO 5 (INVENTION) AND 6 (CONTROL)

Following the same procedure described in Preparation 1 except that the added amounts of ethylene oxide were changed, respectively, POE(60) sorbitol having an OH value of 122.2 and POE(100) sorbitol having an OH value of 75.2 were formed.

Then, following the same esterification procedure described in Preparation 1 except that the feed ratio by weight of each of the POE(n) sorbitols and oleic acid was changed and that the amount of the added neutralizing phosphoric acid was changed, the following esters were formed.

Preparation 3 (Invention)
POE(60) sorbitol sesquioleic acid ester
Acid Value: 1.8,
Saponification Value: 25.7,
OH Value: 79.8

Preparation 4 (Invention)
POE(100) sorbitol sesquioleic acid ester
Acid Value: 1.0,
Saponification Value: 17.0,
OH Value: 51.3

Preparation 5 (Invention)
POE(60) sorbitol dioleic acid ester
Acid Value: 1.6,
Saponification Value: 33.5,
OH Value: 68.9

Preparation 6 (Control)
POE(60) sorbitol trioleic acid ester
Acid Value: 1.8,
Saponification Value: 46.3,
OH Value: 47.8

PREPARATIONS 7 AND 8 (INVENTION)

Following the same procedure described in Preparation 1 except for changing the added amount of weight of the ethylene oxide, POE(40) sorbitol having an OH value of 178.2 was formed.

The esterification reaction was the same as in Preparation 1 except that lauric acid was used in place of oleic acid and the added amounts of the POE(n) sorbitol and neutralizing phosphoric acid were changed, whereby the following esters were formed.

Preparation 7:
POE(40) sorbitol sesquilauric acid ester
Acid Value: 2.0,
Saponification Value: 32.9,
OH Value: 124.3

Preparation 8:
POE(60) sorbitol sesquilauric acid ester
Acid Value: 1.5,
Saponification Value: 23.2,
OH Value: 88.4

PREPARATION 9 (INVENTION)

Synthesis of POE(50) glycerin monolauric acid ester.

1 Gram of caustic soda, which acted as the catalyst, was added to 92 g of glycerin, and then 2,200 g of ethylene oxide was reacted with the glycerin under the reaction conditions as in Preparation 1 to obtain 2,286 g of POE(50) glycerin which was a colorless, transparent liquid having an OH value of 74.8.

1,000 Grams of the resultant POE(50) glycerin was then reacted with 87.7 g of lauric acid in the same manner as the esterification process described in Preparation 1 except that 15 g of activated clay was used in place of phosphoric acid, whereby 1,060 g of POE(50) glycerin monolauric acid ester was obtained. The resultant ester had an acid value of 0.7, a saponification value of 22.4 and an OH value of 46.3.

PREPARATION NO. 10 (INVENTION)

Synthesis of POE(60) saccharose sesquilauric acid ester.

In a five liter pressure reaction vessel, 2,640 g of ethylene oxide was successively added to and reacted with 342 g (1 mol) of saccharose dispersed in 350 ml of xylene in the presence of 1 g of metallic sodium catalyst at 130° to 140° C. under a pressure of 3 to 5 kg/cm$^2$G. The xylene was distilled off at 100° to 120° C. under reduced pressure of less than 5 mmHg to obtain 2,980 g of POE(60) saccharose which was a yellow, viscous liquid having an OH value of 152.5.

1,000 Grams of the resultant POE(60) saccharose was then reacted with 101 g of lauric acid in the same fashion as described in the esterification process of Preparation 1 except that 1.0 g of phosphoric acid is used for neutralization, whereby 1,088 g of POE(60) saccharose sesquilauric acid ester was obtained. The resultant ester had an acid value of 1.4, a saponification value of 25.3 and an OH value of 114.0.

PREPARATION 11 (INVENTION)

Synthesis of POP(10)-POE(50) sorbitol sesquioleic acid ester.

In a five liter pressure reaction vessel, 683 g of propylene oxide was reacted with a mixture consisting of 191.6 g of 95% aqueous solution of sorbitol and 2 g of caustic soda, which acted as the catalyst, at 110° to 120° C. under a pressure of 2 to 4 kg/cm$^2$G, and then 2,590 g of ethylene oxide was reacted therewith at 130° to 140° C. under a pressure of 3 to 5 kg/cm$^2$G to obtain, 3,460 g of POP(10)-POE(50) sorbitol which had an OH value of 116.2.

Following the same esterification process as described in Preparation 1 except that the ratio by weight of the POP(10)-POE(50) sorbitol and oleic acid was changed and the amount of the neutralizing phosphoric acid was changed, POP(10)-POE(50) sorbitol sesquioleic acid ester was formed which had an acid value of 1.3, a saponification value of 25.0 and an OH value of 77.0.

EXAMPLES

| Polymerization formulation (Parts by Weight): | |
|---|---|
| Monomer | 100 |
| Emulsifier | 5 |
| (Anionic surfactant in Example 10 and Control Example 4) | 0.1 |
| Potassium persulfate | 0.1 |
| NaHSO$_3$ | 0.05 |
| Deionized Water | 150 |

OPERATION OF POLYMERIZATION

The emulsifier was put into a four-neck flask and deionized water was added to dissolve same therein. After completely replacing air in the system with nitrogen, KPS was added to the reaction mixture and agitated for 30 minutes under a nitrogen gas stream and then 10 parts by weight of the monomer were added. After the temperature of the reaction system was raised to 50° C., 10 g of 0.5% aqueous solution of NaHSO$_3$ was added and then the temperature of the system was adjusted to 60° C. The remaining 90 parts of the monomer were added to the reaction mixture in dropwise fashion over a period of 1 hour. After completion of dropwise addition of the monomer, the mixture was aged at 60° C. for an additional 1 hour. The agitation speed was 400 rpm throughout these operations.

EVALUATION OF POLYMERIZATION (1) Polymerization stability

After completion of polymerization, the resultant latex was filtered through a metal net of 10 mesh size (JIS), and the agglomerated product was removed, washed with water, dried and weighed. The weight of the agglomerated product was converted into a percentage, based on the weight of the monomer and that percentage is shown in the Table under the heading "Polymerization Stability". The smaller is the value under this heading, the more stable is the polymerization, i.e., fewer large size agglomerates are formed.

(2) Viscosity

The same latex as used in item (1) was subjected to a viscosity measurement at 25° C. with a Brookfield viscometer.

(3) Particle Size

Droplet size was measured by a simplified turbidity measurement. The polymer emulsion was diluted to have a polymer content of 0.1 wt. %, and the turbidity of the diluted emulsion was measured using the Model UV-200 turbidimeter manufactured by Shimazu Seisakusho Ltd. The turbidities of emulsions containing droplets of known sizes were measured to obtain a calibration curve with respect to the droplet size in terms of the turbidity. By means of this calibration curve, the droplet size was determined.

(4) pH Value

The pH value of a 5% aqueous solution of the latex was measured.

(5) Mechanical Stability 40 g of the latex was put into a 200 ml volume tall beaker and agitated at a high speed of 4000 rpm for 5 minutes using a laboratory mixer. The agglomerated product was filtered by a metal net of 100 mesh size (JIS), washed with water, dried and weighed. The percentage of the agglomeration product relative to the total solids is shown. The smaller is the value under this item, the better is the mechanical stability of the emulsion.

(6) Conversion Ratio

After completion of polymerization, a predetermined amount of each latex was picked up, dried at 80° C. overnight under reduced pressure and then weighed. The conversion ratio was determined by comparing the actually measured weight to the theoretical value.

(7) Storage Stability

1 Kg of the polymer emulsion was put into 1 liter volume bottle of polyethylene and allowed to stand at room temperature. The stability of the emulsion was evaluated based on the length of the time during which the emulsion was stable without either forming a precipitated polymer which could not be dispersed again or losing its fluidity due to solidification of the polymer emulsion into a paste-like form.

The ratings in the table have the following meanings:

1 . . . Stable over 3 months

2 . . . Stable for 1–3 months 3 . . . Stable for 1 week to 1 month

4 . . . Stable for 1 day to 1 week.

The results of the evaluations mentioned above are shown in Table 1.

Table 1

| | Emulsifier (Preparation No.) | Monomer | Conversion Ratio (%) | Viscosity (cp) | pH | Particle Size (μ) | Polymerization Stability (%) | Storage Stability | Mechanical Stability (%) | Remarks |
|---|---|---|---|---|---|---|---|---|---|---|
| Example 1 | 2 | Ethylacrylate | 100.0 | 30.0 | 3.9 | 0.3 | 1.2 | 1 | 2.0 | |
| Example 2 | 3 | " | 100.0 | 27.1 | 3.8 | 0.2–0.3 | 1.0 | 1 | 1.5 | |
| Example 3 | 4 | " | 100.0 | 35.0 | 3.6 | 0.2 | 1.5 | 1 | 1.3 | |
| Example 4 | 5 | " | 99.3 | 32.0 | 3.8 | 0.2–0.3 | 1.5 | 1 | 2.0 | |
| Example 5 | 7 | Butylacrylate | 100.0 | 17.8 | 3.9 | 0.2–0.3 | 2.1 | 1 | 3.3 | |
| Example 6 | 8 | " | 100.0 | 16.8 | 3.8 | 0.3 | 3.0 | 1 | 3.5 | |
| Example 7 | 9 | " | 99.2 | 32.0 | 4.0 | 0.3–0.4 | 3.5 | 1 | 3.9 | |
| Example 8 | 10 | " | 100.0 | 20.0 | 4.0 | 0.3 | 3.2 | 1 | 3.3 | |
| Example 9 | 11 | Ethylacrylate | 100.0 | 20.0 | 4.0 | 0.2 | 1.0 | 1 | 1.2 | |
| Example 10 | 3 + Emal*² 2F | " | 99.0 | 72.0 | 4.2 | 0.14 | 0.3 | 1 | 2.6 | Mixed surfactant |
| Control Ex. 1 | 1 | Ethylacrylate | Polymerization stability was extremely poor, and almost all composition was coagulated during polymerization. | | | | | | | |
| Ex. 2 | 6 | Ethylacrylate | Same as above | | | | | | | |
| Ex. 3 | Emulgen*¹ 950 | Butylacrylate | 95.5 | 51.0 | 4.0 | 0.3–0.4 | 5.4 | 1 | 5.2 | |
| Control Ex. 4 | Emulgen 950 + Emal 2F | Ethylacrylate | 99.0 | 123 | 4.0 | 0.14 | 1.3 | 2 | 6.9 | Mixed surfactant |
| Ex. 5 | Emulgen 950 | " | 99.3 | 46.7 | 4.2 | 0.2–0.3 | 2.5 | 1 | 5.8 | |
| Ex. 6 | Tween 20*³ | " | 98.9 | 36.1 | 7 | 0.3 | 13.7 | 3 | 11.3 | pH was adjusted with NaOH |
| Ex. 7 | Tween 20 | Ethylacrylate | Polymerization stability is extremely poor, and almost all composition was coagulated during polymerization | | | | | | | |
| Ex. 8 | Tween 80*⁴ | " | Same as above | | | | | | | |

Note:
*¹Emulgen 950 is polyoxyethylene ($\bar{P}$ = 50) nonylphenyl ether.
*²Sodium coconut oil alcohol sulphate
*³Commercially available ethylene oxide adduct of sorbitol fatty acid ester (HLB = 16.7)
*⁴Commercially available ethylene oxide adduct of sorbitol fatty acid ester (HBL = 15.0).

The embodiments of the invention in which an exclusive property or privilege is claimed are defined as follows:

1. In a process for preparing vinyl polymers by emulsion polymerization which comprises emulsifying an emulsion-polymerizable vinyl monomer in water and maintaining the emulsion under conditions effective to polymerize the monomer, the improvement which comprises: the emulsion is prepared by using as the emulsifier an effective emulsifying amount of a nonionic surfactant which has been prepared by adding 30 to 100 mols of alkylene oxide having from 2 to 4 carbon atoms to one mol of an aliphatic or alicyclic polyhydric alcohol having from 3 to 10 carbon atoms and from 3 to 10 functional hydroxyl groups to form a first reaction product and then esterifying said first reaction product with a long chain fatty acid to introduce one to 2 mols of an acyl group having from 6 to 22 carbon atoms, said emulsifier having an HLB value of from 17 to 19.

2. A process as set forth in claim 1, wherein the acyl group is a straight chain aliphatic acyl group.

3. A process as set forth in claim 2, wherein the number of carbon atoms in the acyl group is 14 to 18.

4. A process as set forth in claim 1, wherein the alkylene oxide is ethylene oxide.

5. A process as set forth in claim 1, wherein the nonionic surfactant is polyoxyethylene (100) sorbitol sesquioleate.

6. A process as claimed in claim 1 wherein the nonionic surfactant has the empirical formula

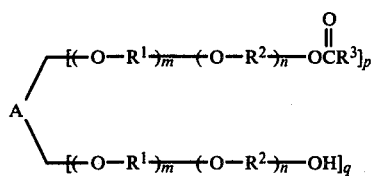

wherein A is the hydrocarbon residue of an aliphatic or alicyclic polyhydric alcohol having (p+q) hydroxyl groups, wherein p and q are numbers defined by the relations $3 \leq (p+q) \leq 10$ and $1 \leq p \leq 2$; $R^1$ and $R^2$ are alkylene having from 2 to 4 carbon atoms and $R^1$ and $R^2$ are the same or different; $R^3$ is alkyl or alkenyl having 5 to 21 carbon atoms; and m and n are numbers defined by the relation $30 \leq (m+n)(p+q) \leq 100$.

* * * * *